Nov. 26, 1968    E. PARUPS    3,412,995
RAM DRIVE MECHANISM
Filed Sept. 22, 1966    5 Sheets-Sheet 1
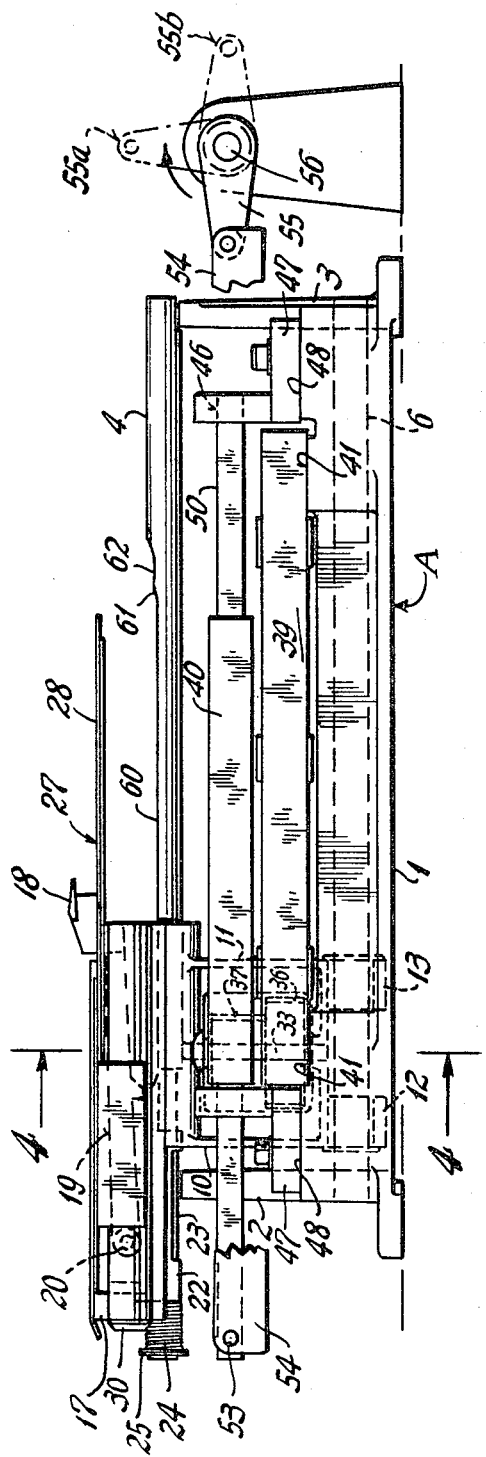
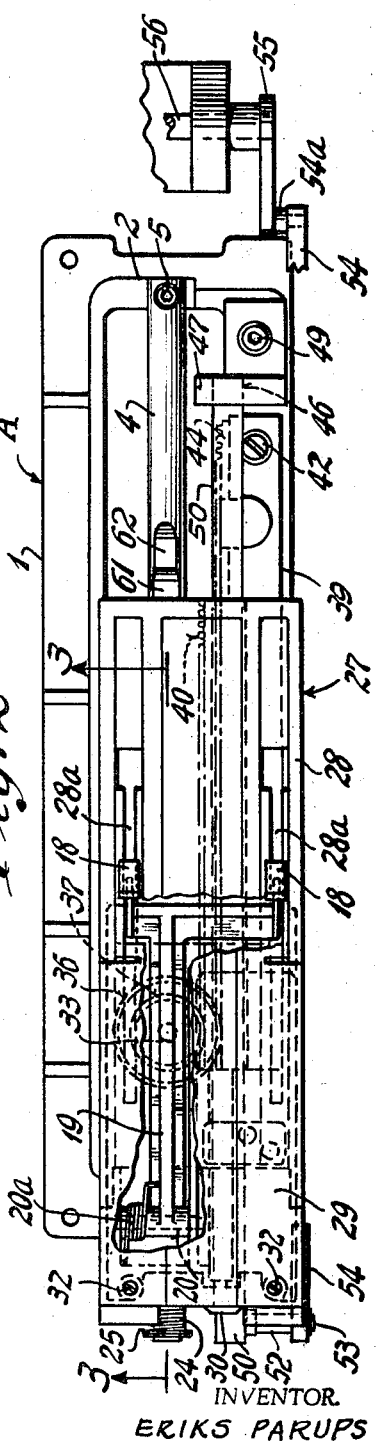
INVENTOR.
ERIKS PARUPS
BY
Charles J. Hickey
ATTORNEY

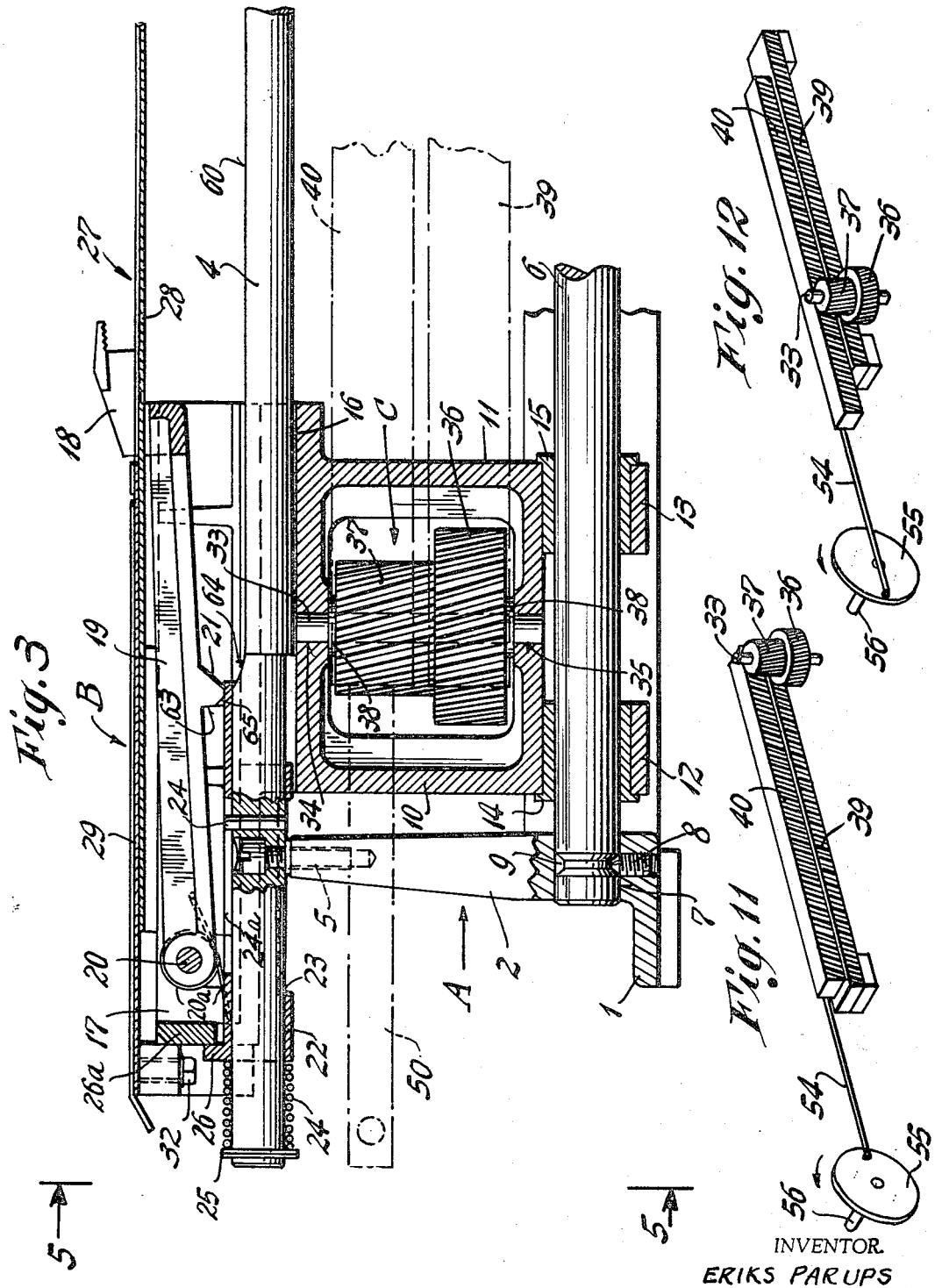

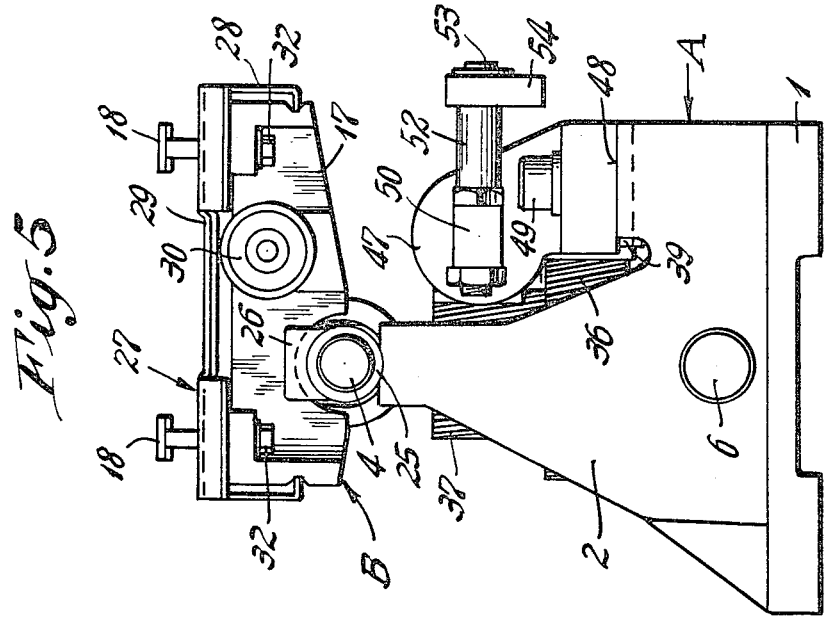
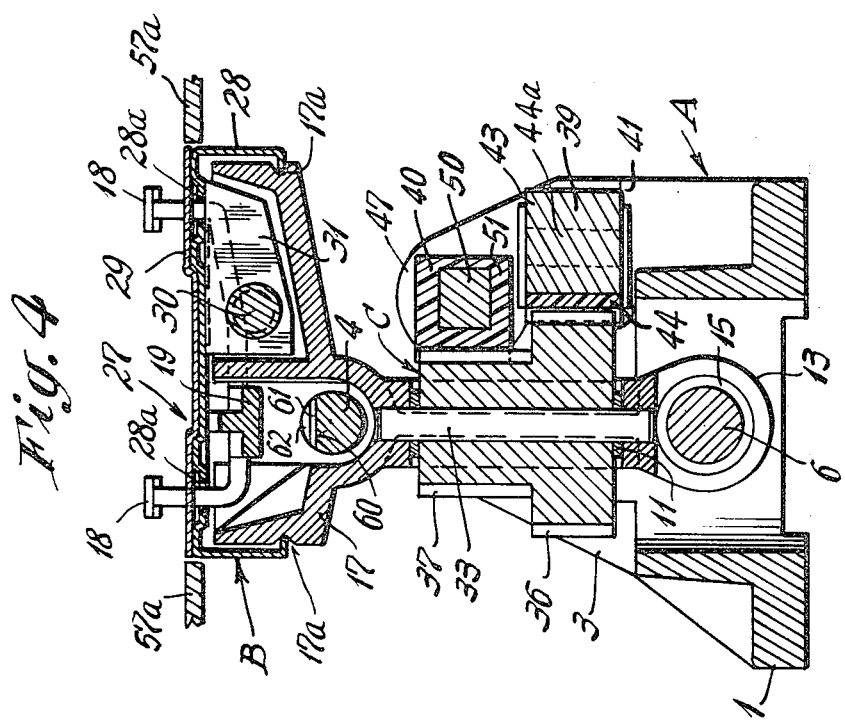

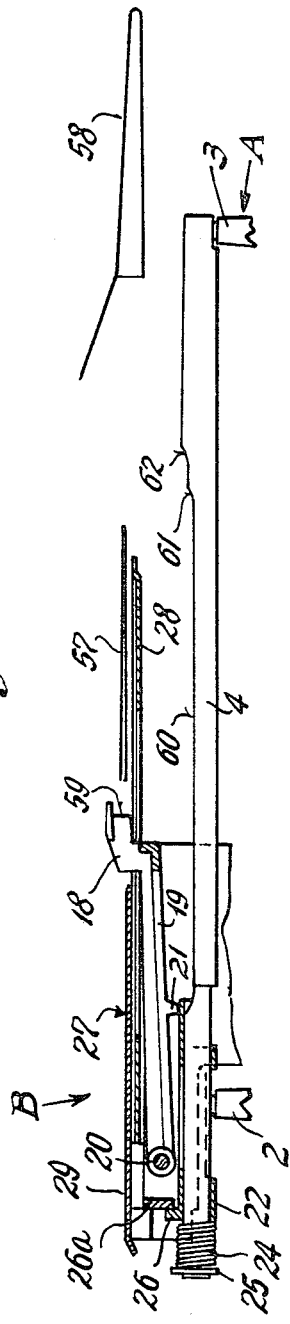
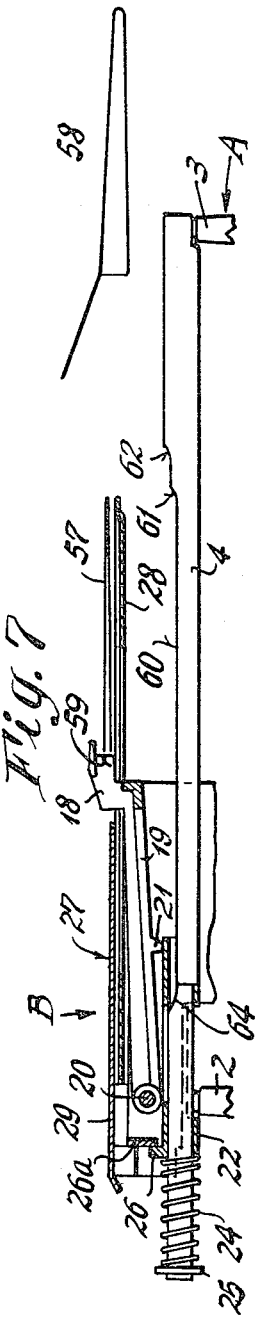
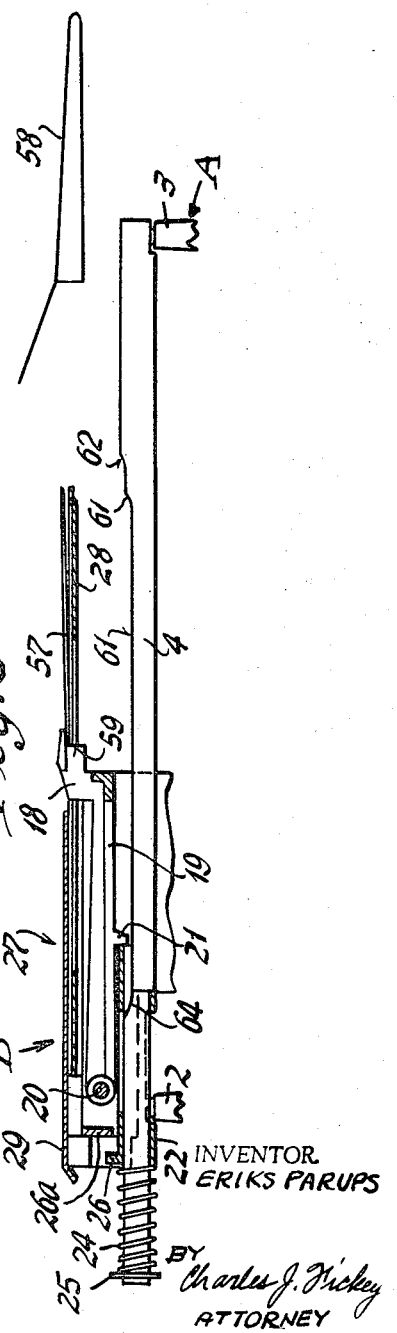

Nov. 26, 1968   E. PARUPS   3,412,995
RAM DRIVE MECHANISM
Filed Sept. 22, 1966   5 Sheets-Sheet 5
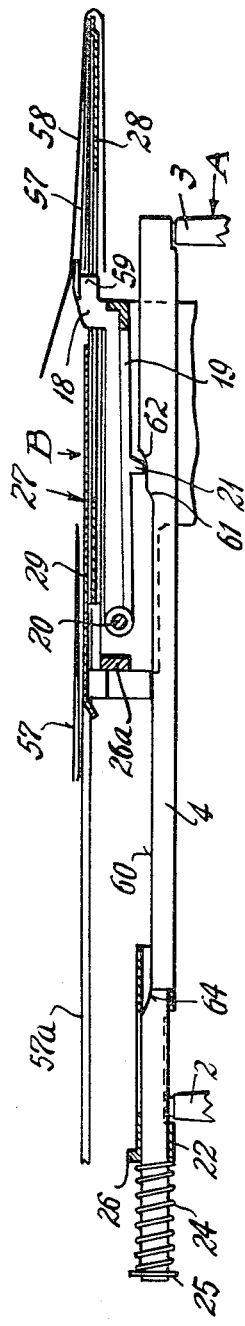
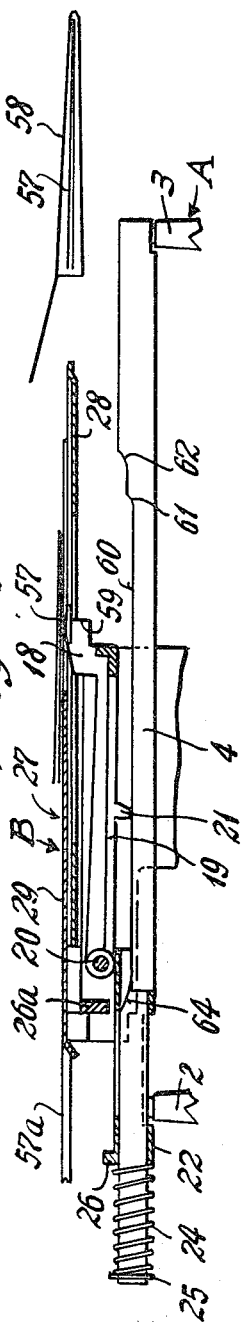
INVENTOR.
ERIKS PARUPS
BY Charles J. Hickey
ATTORNEY United States Patent Office 3,412,995
Patented Nov. 26, 1968

3,412,995
RAM DRIVE MECHANISM
Eriks Parups, Norwalk, Conn., assignor to Pitney-Bowes, Inc., Stamford, Conn., a corporation of Delaware
Filed Sept. 22, 1966, Ser. No. 581,327
15 Claims. (Cl. 271—54)

ABSTRACT OF THE DISCLOSURE

A differential drive and feed mechanism for moving relatively flat items between two spaced apart positions in response to a power unit movement of considerably shorter distance than the distance between the spaced apart positions. A gripping and feeding ram is mounted for reciprocatory movement between the spaced apart positions and rotatably carries a differential pinion assembly which simultaneously meshes with a fixed rack and a movable rack connected to the power unit. A short stroke of the driven rack produces a longer stroke of the ram depending on the diameter ratio of the differential pinion assembly.

This invention relates to a differential rack and pinion reciprocating ram or transport mechanism. The invention more particularly relates to a reciprocating ram drive mechanism, for use in a package or envelope stuffing or inserting mechine, for example.

One example of a ram drive mechanism for a stuffing machine is disclosed in United States Patent Number 2,736,999 to F. J. Rouan et al. In that mechanism, the ram was directly coupled to a chain drive passing around two spaced apart pulleys. In such a system, in order to obtain the drive stroke length desired, the pulleys must be separated by a distance equal to the desired length of drive stroke. The power stroke is thus equivalent to the drive movement. Moreover, the velocity curve is relatively flat with acceleration and deceleration occuring only during short periods at the terminal portions of each stroke.

As it is well known, in business machines such as for example envelope stuffing machines, space is usually limited in the machine for the operating mechanism required. Thus it is important that the mechanism be as compact as possible. Moreover, a ram drive for such a machine must complete the stroke as rapidly as possible, from start at a first position to stop at a second position and from a start at the second position to a stop at the first position, without undue shock on the mechanism.

It is an object of this invention to provide a differential rack and pinion reciprocating ram drive mechanism having a substantially sinusoidal acceleration characteristic.

Another object is to provide a ram drive mechanism which is compact in construction.

A further object is to provide a ram drive and gripper mechanism for stuffing inserts into packages.

An additional object is to provide a ram drive for stuffing inserts into envelopes which has a simplified gripper mechanism.

These and other objects of my invention will become apparent as the description thereof proceeds.

The above objects are attained by the use of the invention which consists basically of two pinions of different diameter fixed to a common shaft, a fixed rack in contact with the teeth of the pinion of larger diameter, and a movable rack in contact with the teeth of the pinion of smaller size. The racks are mounted in parallel relation. A translational movement of the movable rack causes translational movement of the pinion shaft, with each pinion rolling along its respective rack. A short stroke of the movable rack results in the pinion shaft being moved a greater distance depending on the ratio of pinion diameters. The ram is mounted on the pinion shaft and guides are provided for the longitudinal movement of the pinion shaft and the ram. The gripper member of the ram is cammed up and down by cam surfaces in one of the guides. The movable rack is operated by a crank turning through one revolution. The length of the crank determines the power stroke and therefore movement of the movable rack. Thus by varying the relative diameter of the pinions, it is possible to obtain in a simple manner a relatively longer movement of the ram stroke in relation to the length of the power stroke. All gear parts may be molded of any suitable plastic, further simplifying the construction of the ram mechanism.

The invention may be better understood by reference to the drawings, which illustrate an embodiment of the invention, in which:

FIG. 1 is a side view in elevation of the complete ram drive and gripper assembly, FIG. 2 is a plan view of the assembly of FIG. 1 with parts of the ram plate broken away, FIG. 3 is a partial view in cross section taken along the lines 3—3 of FIG. 2, showing the pinion and ram drive structure in greater detail, FIG. 4 is a cross sectional view of the ram drive taken along the lines 4—4 of FIG. 1, FIG. 5 is an end view in elevation of the ram drive and gripper assembly as seen from 5—5 of FIG. 3, FIGS. 6 to 10 represent different stages of the ram stroke.

FIGS. 11 and 12 are perspective views of the differential rack and pinion drive mechanism.

Referring to the figures, the ram drive assembly comprises broadly three main components, a support A (see FIGS. 1 to 5), a moving ram carriage B (see FIGS. 1, 3 and 5), and a carriage drive mechanism C (see FIGS. 1, 3 and 5). The ram carriage is shown in the initial or home position on support A in FIGS. 1, 2 and 3 and is driven toward the opposite end of support A by the drive mechanism C in a manner which will be explained in greater detail subsequently, for the forward or ram stroke and in the opposite direction for the return stroke.

Support A consists of an elongated base frame 1, with a vertical stand 2 at one end and a similar stand 3 at the other end. An upper guide rod 4 is bolted to the top of stands 2 and 3 by suitable bolts 5. A lower guide rod 6 is fitted in bores 7 in stands 2 and 3 near base 1 and held secure by means of set screws 8 which fit in annular grooves 9 in rod 6.

Carriage B is slidably mounted on rods 4 and 6. Carriage B has a cage consisting of vertical ribs 10 and 11, and terminating in journals 12 and 13 which are fitted around rod 6 with bushings 14 and 15. At the upper end, carriage B is fitted around rod 4 by means of a continuous bore 16 forward of stand 2. Carriage B has an upper frame 17 disposed generally horizontally. A set of gripper fingers 18 are connected to an arm 19 which is pivotally mounted to a pivot 20 in carriage frame 17 and biased downwardly by a torsion spring 20a. A cam follower 21 is positioned on the lower side of arm 19 and is adapted to ride on the upper surface of rod 4 to raise and lower fingers 18, as will be described in greater detail subsequently.

As best seen in FIG 3, a stop sleeve 22 is fitted around section 4a of rod 4 which has been cut to a smaller size than the remaining section 4b to form a shoulder 4c on rod 4. Sleeve 22 fits around stand 2 by means of a notch 23. A slot 24a is provided in the top of sleeve 22 to allow for a pin 24b in rod 4 which limits the movement of sleeve 22 to the slot length. Sleeve 22 abuts a coil spring 24 around rod 4 which is kept on the shaft by means of a suitable washer 25. Sleeve 22 has a stop flange 26 which projects upwardly sufficiently to engage a depending section 26a of upper frame 17 when it is at the initial or home position.

A ram plate generally designated by the numeral 27 is fitted onto the upper side of frame 17. Ram plate 27 consists of a lower, forward plate 28 which slides in grooves 17a on the sides of frame 17. An adjusting screw 30 is provided with its threaded end fitting into a flange 31 on the lower side of plate 28 with the other end projecting from the rear of and fixed to frame 17. By turning screw 30, ram plate 28 may be adjusted forward or backward. Slots 28a are provided in plate 28 to permit movement of the plate past the projecting fingers 18 and to provide for passage of the fingers through the plate when arm 19 is pivoted. Upper ram plate 29 is attached to the rearmost part of frame 17 by suitable screws 32, and projects over the end of lower ram plate 28.

As best seen in FIG. 3, cage 10 has a shaft 33 journaled in upper and lower openings 34 and 35 respectively. A large pinion 36 and a small pinion 37 are fixed mounted on shaft 33 and washers 38 maintain spacing of pinions and shaft within cage 10. If desired, pinions 36 and 37 may be a single molded unit. The relative sizes of the pinions is a matter of choice as explained later.

As shown in FIG. 4, pinions 36 and 37 engage racks 39 and 40 respectively. Rack 39 is a fixed rack, with the ends mounted on bosses 41 at each of support A by suitable bolts 42, bosses 41 being along a side of base 1 as shown in FIG. 4. Rack 39 may be of any conventional construction. However, in a preferred embodiment as shown in FIG. 4, the body 43 of the rack is metal with plastic rack teeth 44 molded directly on the operating face of the rack and through perforations 44a in the body 43.

Rack 40 consists of a bar 45 of square cross section journaled in openings 46 in angle supports 47 mounted on bosses 48 at each end of support base 1 (see FIGS. 1 and 5) by suitable bolts 49. Rack 40 is similar to rack 39 in that the body 50 is of metal with the rack teeth 51 being of plastic molded directly around the body. A connecting pin 52 is bolted to the drive end of rack 40 which projects through the angle 47 at the rear of the ram. Pin 52 is pivotally connected at point 53 to drive arm 54 (see FIG. 1). The forward end of drive arm 54 is pivotally connected by a pin 54a to a crank 55 rotatably mounted on a power shaft 56 operated by a source of power not shown.

In operation, ram carriage B is moved from a home position (as shown in FIG. 1) to a position for stuffing envelopes, sliding to the opposite ends of rods 4 and 6 on support A and back to the home position, driven by the drive mechanism C (see also FIGS. 6 to 11). Referring to FIG. 1, power shaft 56 turns crank 55 in a clockwise direction which exerts a force on drive arm 54. Drive arm 54 in turn causes movable rack 40 to slide in the journals 46 in angles 47 in the direction toward the stuffing position. Teeth 51 of rack 40 are engaged with pinion 37 and therefore exert what would normally be a turning moment of pinion 37 in a counterclockwise direction. However, since pinions 37 and 36 are fixed to a common shaft 33, pinion 37 can only rotate if pinion 36 does. Since pinion 36 is engaged with the teeth 44 of fixed rack 39, pinion 36 is prevented from rotating in a counterclockwise direction and thus also is pinion 37 prevented from rotating counterclockwise. The resultant movement is a linear translation of shaft 33 in a direction along rods 4 and 6. Since pinion 36 is engaged with racks 39, as shaft 33 translates, pinion 36 will be caused to rotate in a clockwise direction due to the rack and pinion engagement. Moreover, since pinion 36 is larger than pinion 37 on which the force is being exerted, pinion 36 will roll a relatively greater distance along rack 39 in proportion to the actual movement of rack 40. Thus for a small movement of rack 40 (or a small power stroke) a relatively large ram stroke is obtained as pinion 36 travels the length of rack 39 driving ram carriage B by means of shaft 33. Since shaft 33 moves through a greater distance than the power stroke of rack 40, pinion 37 will also roll along rack 40. On the return stroke, the action of the drive mechanism will be the reverse of the above description.

The total length of power stroke is determined by the length of crank 55. The action of the drive mechanism may be further understood by reference to FIGS. 11 and 12, where the mechanism has been reversed in position in comparison to FIG. 1 to more clearly illustrate the position and movement of the movable rack 40 and pinions 36 and 37. It will be clear that for a relatively short power stroke, the diameter of crank 55, pinion 36 has moved the entire length of fixed rack 39. As previously mentioned, the ratio of power stroke to ram stroke can be established as desired by the relative size of the two pinions.

In FIGS. 6 to 11, the stuffing or inserting operation of the ram assembly is shown. In particular, the action of gripper fingers 18 may be seen. In these figures, the ram carriage advances from the initial or home position in FIG. 6 through a pickup station and to the stuffing position at the envelope and returns to the initial position.

In FIG. 6, the ram carriage is shown at the extreme limit of travel on a return stroke. In this position, section 26a of carriage frame 17 abuts against stop flange 26 of sleeve 22, forcing sleeve 22 to compress spring 24 slightly. Cam follower 21 on arm 19 rests on the upper surface of sleeve 22 and thus maintains gripper fingers 18 in a raised position. An insert 57, such as a card or folded letter, is positioned at the pickup station 57a to be stuffed into envelope 58 which is held in an open position by means not shown.

In FIG. 7, ram carriage 17 has advanced in the forward stroke to the position where springs 24 is in a relaxed condition, with sleeve 22 still in abutting relation and arm 19 still resting on sleeve 22 to keep gripper fingers 18 raised. However, this is the limit of forward movement of sleeve 22, since it is stopped by shoulder 4c on upper guide rod 4 formed at the junction of the smaller section 4a of rod 4 and the large section 4b. At this position the lower forward face 59 of gripper fingers 18 make contact with the rear edge of insert 57.

In FIG. 8, sleeve 22 has become stationary as mentioned above, so that the continued forward movement of carriage frame 17 moves cam follower 21 beyond the forward edge of sleeve 22 and arm 19 is moved to the clamping position by torsion spring 20a. A cut out portion 60 of rod 4 allows arm 19 to drop so that insert 57 is clamped by the underside of fingers 18 to ram plate 28. From this position, the ram carries the insert forward to envelope 58.

In FIG. 9. the ram has completed the forward stroke with plate 28 carrying insert 57 thrust into envelope 58. At this point, the cut out 60 on rod 4 has rising cam surfaces 61 and 62. Follower 21 on arm 19 first rides up cam surface 61 and raises gripper fingers 18 so that insert 57 is no longer clamped to plate 28. Cam surface 62 then limits the upward movement of fingers 18 at the extreme limit of the forward stroke so that they do not interfere with the envelope.

On the return stroke, the ram plate 28 is withdrawn from envelope 58 which is removed by means not shown and replaced by a new envelope, by any means known in the art. As shown in FIG. 10, on the return stroke, the follower 21 of arm 19 rides on the cut out 60 so that the gripper fingers are low enough to be even with or beneath the surface of plate 28 to pass under a next insert 57 which is already in position on the machine deck 57a (see FIG. 4). On return of carriage 17 to the initial position, the rear face 63 of follower 21 makes contact with the forward edge of sleeve 22, as shown in the forward moving position of FIG. 8, and drives the sleeve back against spring 24. As follower 21 reaches the rising cam surface 64, at the end of cut out 60, arm 19 is lifted so that the curved portion 65 is in contact with the forward edge of sleeve 22 (see FIG. 3). The compressive force in spring 24 then drives sleeve 22 forward quickly under follower 21, while the carriage continues to move rearwardly, until flange 26 abuts section 26a of carriage frame 17 so that arm 19 is lifted and gripper fingers 18 will be raised for the next ram stroke as described above. The continued rearward movement is limited by slot 24a coming into contact with pin 24 on rod 4.

Thus a gripper mechanism has been provided which is effective, while being simple in construction and operation and which requires no complex mechanical drive linkages.

Moreover, in the ram mechanism of the invention the effective power stroke is amplified, as previously explained, by selecting the ratio of diameters of the pinions as desired to obtain the desired movement of the ram in proportion to the movement of the crank drive.

In addition the acceleration of the ram carriage 17 is rapid during the clockwise rotation of crank 55 (see FIG. 1) from the solid line position and reaches the maximum velocity at chain line position 55a, after which the deceleration is rapid until the stop position is reached at chain line position 55b. Thus the acceleration curve is substantially sinusoidal in character which is advantageous for the short time allowed for each insertion cycle. Continued rotation of crank 55 causes the return stroke of the ram carriage 17.

Although the invention has been described in stuffing an insert into an envelope, it will be obvious that the principles of my invention are applicable to inserting other articles into packages in general.

While certain specific embodiments and preferred mode of practice of the invention has been described, it will be understood that this is solely for the purpose of illustration and that various changes and modifications may be made in the invention without departing from the spirit of the invention or the scope of the appended claims.

I claim:

1. A ram mechanism, comprising
   guide means defining the operative ram axis,
   ram means adapted to move along said guide means, and
   means to drive said ram means through a cycle along said axis from an initial position to an operative position and return,
   said drive means comprising,
   a frame fixed to said ram means for movement therewith between said initial and operative positions,
   differential pinion means rotatably mounted in said frame,
   a fixed rack aligned parallel to said axis in meshing contact with one of said differential pinions,
   a movable rack aligned parallel to said axis in meshing contact with the other of said differential pinions and adapted to move along said axis, and
   means to impart a reciprocating movement to said movable rack.

2. The ram mechanism of claim 1 wherein the pinion in contact with the fixed rack has a larger diameter than the pinion in contact with the movable rack.

3. A ram mechanism, comprising
   guide rod means defining the operative ram axis,
   a carriage adapted to move along said guide rod means,
   a ram mounted on said carriage, and
   means to drive said carriage through a cycle along said axis from an initial position to an operative position and return,
   said drive means comprising,
   a frame fixed to said carriage for movement therewith between said initial and operative positions.
   differential pinion means rotatably mounted in said frame,
   a fixed rack aligned parallel to said axis in meshing contact with one of said differential pinions
   a movable rack aligned parallel to said axis in meshing contact with the other of said differential pinions, and adapted to move along said axis, and
   means to impart a reciprocating movement to said movable rack.

4. The ram mechanism of claim 3 wherein the fixed rack pinion is larger than the movable rack pinion.

5. The ram mechanism of claim 4 wherein said differential pinion means comprises a single element having two pinion surfaces and being mounted on said frame by means of a rotatable shaft.

6. A ram mechanism, comprising
   guide rod means defining the operative ram axis,
   a carriage adapted to move along said guide rod means,
   a ram mounted on said carriage, and
   means to drive said carriage through a cycle along said axis from an initial position to an operative position and return,
   said drive mechanism comprising
   differential pinion means mounted on said carriage,
   a fixed rack aligned parallel to said axis in meshing contact with one of said differential pinions,
   a movable rack aligned parallel to said axis in meshing contact with the other of said differential pinions, and adapted to move along said axis,
   means to impart a reciprocating movement to said movable rack,
   and gripper means on said carriage for clamping an article, and means to open and close said gripper means during said reciprocating movement.

7. A ram mechanism, comprising
   guide rod means defining the operative ram axis,
   a carriage adapted to move along said guide rod means,
   a ram mounted on said carriage, and
   means to drive said carriage through a cycle along said axis from an initial position to an operative position and return to define an operative stroke and a return stroke,
   said drive mechanism comprising,
   differential pinion means mounted on said carriage,
   a fixed rack aligned parallel to said axis in meshing contact with one of said differential pinions,
   a movable rack aligned parallel to said axis in meshing contact with the other of said differential pinions, and adapted to move along said axis,
   means to impart a reciprocating movement to said movable rack, and
   gripper means on said carriage for clamping an article during the operative stroke of said carriage.

8. The ram mechanism of claim 7 including a cam surface along said ram axis to move said gripper means from open to clamping position.

9. The ram mechanism of claim 8 wherein said gripper means comprises means pivotally mounted on said carriage for movement above and below the surface of said ram.

10. The ram mechanism of claim 9 wherein said cam surface is adapted to maintain said gripper means open at the start of said operative stroke, closed during said stroke, open at the end of said stroke, and below said ram surface during said return stroke.

11. The ram mechanism of claim 10 wherein said cam surface is formed on said guide rod means.

12. The ram mechanism of claim 11 wherein means is provided whereby said gripper means opens on the return stroke at a point to the rear of where it closes on the forward stroke.

13. A transport mechanism, comprising
    a carriage,
    means to support said carriage in a slidable relationship, and
    means to drive said carriage through a cycle, along an axis from an initial position to an operative position and return,
    said drive means comprising, a frame fixed to said carriage for movement therewith between said initial and operative positions,
differential pinion means rotatably mounted in said frame,
a pair of racks mounted parallel to said axis,
one of said racks being fixed and in mesh with one of said differential pinions,
the other of said racks being in mesh with the other of said differential pinions, and adapted to move along a path parallel to said axis, and
means to impart a reciprocating movement to said movable rack.

14. A ram mechanism for inserting an article into a package comprising,
a guide means, defining the operative ram axis,
a carriage adapted to move along said guide means, and
means to drive said carriage through a cycle along said axis from an initial position, through a pickup station and to a delivery position and return, to define a forward and return stroke,
said drive mechanism comprising
differential pinion means mounted on said carriage,
a fixed rack aligned parallel to said axis in meshing contact with one of said differential pinions,
a movable rack aligned parallel to said axis in meshing contact with the other of said differential pinions, and adapted to move along said axis,
said fixed rack pinion being larger than said movable rack pinion,
means to impart a reciprocating movement to said movable rack,
gripper means on said carriage for clamping an article,
means associated with said guide means for operating said gripper means, to close said gripper means at said pickup station, to open said gripper means at said delivery station, to maintain said gripper means below said pickup station on said return stroke, and to open said gripper means to the rear of said pickup station.

15. A ram mechanism for inserting an article into a package comprising,
guide rod means defining the operative ram axis,
a carriage adapted to move along said guide means,
a ram plate mounted on said carriage, and
means to drive said carriage through a cycle along said axis from an initial position through a pickup position and to a delivery station and return, to define a forward and return stroke,
said drive mechanism comprising,
differential pinion means mounted on said carriage,
a fixed rack aligned parallel to said axis in meshing contact with one of said differential pinions,
a movable rack aligned parallel to said axis in meshing contact with the other of said differential pinions, and adapted to move along said axis,
said fixed rack pinion being larger than said movable rack pinion,
means to impart a reciprocating movement to said movable rack,
gripper fingers pivotally mounted on said carriage for movement in a vertical plane above and below said ram plate surface, said fingers together with said ram plate providing means to clamp an article to said plate,
means to actuate said gripper fingers during said forward and return stroke,
means adjacent said initial position for maintaining said gripper fingers above said plate on said forward stroke until said pickup station is reached,
means to bring said fingers into clamping relation with said plate to clamp an insert to said plate at said pickup station,
cam means on said rod means to raise said gripper fingers to an open position above said ram plate at said delivery position,
cam means on said rod means to allow said fingers to drop below said ram plate surface during said return stroke, whereby to pass under said pickup station,
cam means on said rod means for raising said gripper fingers to an open position above said plate beyond said pickup station and at the end of said return stroke, and
means to engage said gripper fingers with said means to maintain said gripper fingers raised at said initial position.

References Cited
UNITED STATES PATENTS

| 1,522,124 | 1/1925 | Hoisington | 77—34.6 X |
| 1,559,962 | 11/1925 | Heinitz | 74—33 |

ANDRES H. NIELSEN, *Primary Examiner.*